United States Patent [19]

Pocock et al.

[11] Patent Number: 4,734,764
[45] Date of Patent: Mar. 29, 1988

[54] CABLE TELEVISION SYSTEM SELECTIVELY DISTRIBUTING PRE-RECORDED VIDEO AND AUDIO MESSAGES

[75] Inventors: Terrence H. Pocock, Mount Brydges; Peter J. M. Coumans, London; Richard M. McNorgan, London; George M. Hart, London, all of Canada

[73] Assignee: Cableshare, Inc., London, Canada

[21] Appl. No.: 730,822

[22] Filed: May 6, 1985

[51] Int. Cl.$^4$ .............................................. H04N 7/10
[52] U.S. Cl. ........................................... 358/86; 455/4
[58] Field of Search ............... 358/84, 86, 146; 455/2, 455/4, 5

[56] References Cited

U.S. PATENT DOCUMENTS

| | | |
|---|---|---|
| 3,581,209 | 9/1968 | Zimmermann et al. . |
| 3,746,780 | 7/1973 | Stetten et al. ............... 179/2 TV X |
| 3,878,560 | 4/1975 | Ramage . |
| 3,909,512 | 9/1975 | Omori et al. . |
| 3,938,189 | 2/1976 | Goldmark . |
| 3,968,327 | 7/1976 | Gregg, III . |
| 4,008,369 | 2/1977 | Theurer et al. .................. 358/86 X |
| 4,009,331 | 2/1977 | Goldmark et al. . |

(List continued on next page.)

FOREIGN PATENT DOCUMENTS 752973 2/1967 Canada .
850286 8/1970 Canada .

(List continued on next page.)

OTHER PUBLICATIONS

*Telephony's Dictionary*, 1st Ed., Jun. 1982, p. 218, ©1982 by Telephony Publishing Corp., TK 5102 L3 1982.

Magara et al., "Advanced Video Response System—Phase III", Japan Telecommunications Review, Jul. 1981, pp. 243-249.

Primary Examiner—Keith E. George
Attorney, Agent, or Firm—Burns, Doane, Swecker & Mathis

[57] ABSTRACT

A method of, and a system for, selectively delivering still television video with accompanying audio to home subscribers over a cable television system for advertising, promotional or educational purposes. A maximum number of home subscribers can interactively request presentations of their own choosing to be displayed on their home television sets. Only one standard television channel is required for transmission of still video with accompanying audio to serve 300 concurrent users. No equipment is required in the subscriber's home. The video is presented as still frames from one of a number of videodisc players, transmitted over one television channel during the appropriate time interval of 1/30th (or 1/25th) of a second. Such video frames, which may also contain overlaid graphics information, are uniquely addressed to a remote storage device. Unused bandwidth is used for the transmission of up to 300 discrete audio messages. The remote storage device identifies the appropriate video still frame, stores it, combines it with the corresponding audio message and conveys both to the home subscribers' television on a preselected channel. By uniquely addressing video frames to the remote storage device, either 30 (or 25) different video frames per second can be conveyed on one television channel to 30 (or 25) different remote storage devices for retransmission to home subscribers. Thus, if a home subscriber sees a given still video frame for 10 seconds, his remote storage device need not be updated for those 10 seconds, enabling the system to transmit 300 (10 seconds × 30/second) different video frames to 300 other remote storage devices, thereby serving 300 concurrent users.

51 Claims, 10 Drawing Figures

U.S. PATENT DOCUMENTS

| | | | |
|---|---|---|---|
| 4,028,733 | 6/1977 | Ulicki | 358/86 X |
| 4,035,838 | 7/1977 | Bassani et al. | 358/86 |
| 4,045,819 | 4/1977 | Goldmark . | |
| 4,057,829 | 11/1977 | Moorehead | 358/86 |
| 4,058,830 | 11/1970 | Guinet et al. | 358/86 |
| 4,065,794 | 12/1977 | Shutterly . | |
| 4,058,830 | 11/1977 | Guinet et al. | 358/86 |
| 4,104,681 | 8/1978 | Saylor et al. . | |
| 4,199,781 | 4/1980 | Doumit . | |
| 4,205,343 | 5/1980 | Barrett . | |
| 4,222,073 | 9/1980 | Hirashima . | |
| 4,233,623 | 11/1980 | Pavliscak . | |
| 4,253,115 | 2/1981 | Kergosien et al. . | |
| 4,264,924 | 4/1981 | Freeman | 358/86 |
| 4,264,925 | 4/1981 | Freeman | 358/86 |
| 4,295,154 | 10/1981 | Hata et al. . | |
| 4,303,941 | 12/1981 | Marti et al. . | |
| 4,303,942 | 12/1981 | Fukuda et al. . | |
| 4,316,217 | 2/1982 | Rifken | 358/86 |
| 4,335,402 | 6/1982 | Holmes . | |
| 4,337,483 | 6/1982 | Guillou . | |
| 4,359,631 | 11/1982 | Lockwood et al. . | |
| 4,381,522 | 4/1983 | Lambert | 358/86 |
| 4,383,279 | 5/1983 | Kenney, II . | |
| 4,404,589 | 9/1983 | Wright, Jr. | 358/86 |
| 4,426,698 | 1/1984 | Pargee, Jr. . | |
| 4,429,332 | 1/1984 | Pargee, Jr. . | |
| 4,439,784 | 3/1984 | Furukawa et al. | 358/86 |
| 4,449,198 | 5/1984 | Kroon et al. . | |
| 4,450,477 | 5/1984 | Lovett | 358/86 |
| 4,450,481 | 5/1984 | Dickinson | 358/86 X |
| 4,461,032 | 7/1984 | Skerlos | 358/86 X |
| 4,499,568 | 2/1985 | Gremillet . | |
| 4,510,531 | 4/1985 | Sugiyama . | |
| 4,518,989 | 5/1985 | Yabiki et al. | 358/86 |
| 4,531,161 | 7/1985 | Murakoshi . | |
| 4,538,176 | 8/1985 | Nakajima et al. | 358/86 |

FOREIGN PATENT DOCUMENTS

| | | | |
|---|---|---|---|
| 892814 | 2/1972 | Canada . | |
| 965526 | 4/1975 | Canada . | |
| 973634 | 8/1975 | Canada . | |
| 997858 | 9/1976 | Canada . | |
| 1025997 | 2/1978 | Canada . | |
| 1106056 | 7/1981 | Canada . | |
| 1112380 | 11/1981 | Canada . | |
| 1117211 | 1/1982 | Canada . | |
| 1118094 | 2/1982 | Canada . | |
| 1120581 | 3/1982 | Canada . | |
| 1123951 | 5/1982 | Canada . | |
| 1124834 | 6/1982 | Canada . | |
| 1127753 | 7/1982 | Canada . | |
| 1131762 | 9/1982 | Canada . | |
| 1137214 | 12/1982 | Canada . | |
| 1152206 | 8/1983 | Canada . | |
| 1156349 | 11/1983 | Canada . | |
| 1160734 | 1/1984 | Canada . | |
| 1163357 | 3/1984 | Canada . | |
| 1182555 | 2/1985 | Canada . | |
| 1186793 | 5/1985 | Canada . | |
| 1189612 | 6/1985 | Canada . | |
| 52-22815 | 2/1977 | Japan | 358/86 |

CABLE TELEVISION SYSTEM SELECTIVELY DISTRIBUTING PRE-RECORDED VIDEO AND AUDIO MESSAGES

The invention relates to a system and method of delivery to a home subscriber of still television video frames with accompanying audio message, interactively as requested by the home subscriber. In the preferred embodiment, the invention relates to this system and method being applied to a community antenna television facility (CATV).

BACKGROUND OF THE INVENTION

In North America and elsewhere, it is common that large numbers of homes subscribe to a CATV to receive by coaxial cable a number of commercial and public television signals. Each signal consists of television video and audio, comprised of continuous audio and 30 (or 25) video frames per second. Each signal is transmitted down the coaxial cable by the CATV system to the subscriber's home television set over a discrete band of frequency known as a "channel". The subscriber tunes his television to the channel desired and receives the composite television signal.

It is not uncommon that a CATV have upwards of 50,000 subscribers. On such a large CATV, there is generally a central "hub" which acts as a control center to receive the various signals, whether "broadcast" or satellite delivered, or locally generated by CATV operators or third parties. These signals are put on a trunk coaxial cable. Signal losses occur along the CATV coaxial cables and it is thus common that amplifiers, known in the trade as bridger amplifiers, be located at strategic locations, or nodes. Typically therefore, a CATV system comprises a plurality of antennas adapted to receive signals from a plurality of broadcast stations or from satellite transponders. Amplifiers and the like located at a central hub amplify these signals and transmit each of them as a unique channel of frequencies onto one or more trunk coaxial cables Along the trunk coaxial cable are a plurality of nodes. At each node a bridger amplifier amplifies the signals from the trunk and conveys the amplified signals onto one of a plurality of secondary distribution coaxial cables. Each secondary distribution cable has a plurality of "taps", each of which has a plurality of "drop" coaxial cables, one to each subscriber. Generally, any secondary distribution cable will service approximately 200 subscribers and there are normally between 50 and 100 taps so that each tap will service 2 to 4 drops.

Other systems have been developed to interactively distribute information to subscribers' televisions at their request. In order to be viable, such systems must:
1. service a large number of subscribers simultaneously;
2. delivery high quality video images within a short response time;
3. operate without requiring new hardware in the subscriber's home; and
4. operate within the constraints of the number of television channels available on a typical CATV. Most CATV's have a maximum of approximately 15 "empty" channels.

No interactive system to date has succeeded in meeting all of the above requirements. Typically, the number of simultaneous users has been limited to a very small number. To send a live video image, one television channel is required for each subscriber; therefore, only approximately 15 subscribers could be serviced at one time. Or, in order to increase the number of simultaneous users, only computer graphics have been delivered, sacrificing picture quality and speed of delivery. The invention described in this application meets all four of the above-mentioned requirements. In addition, the invention delivers accompanying audio messages along with the video images, for a complete presentation.

THE INVENTION

The invention conveys still frame television quality video, overlaid with graphics information, together with an audio message, to a large number of CATV subscribers, using only one television channel. No additional hardware is required in the home. The subscriber can use his home telephone to make his requests for specified demonstrations or information. A pluralty of videodisc players store and transmit the video and audio as required. The number of videodisc players, their attendant control mechanisms and remote storage devices can be varied as required to meet the demands of the subscribers for particular information or services. For instance, information that is requested frequently can be stored in more than one videodisc player for simultaneous access by multiple subscribers. In the same way, the breadth of information can be expanded indefinitely by adding video disc players as required to expand the "pool" of information available to the subscribers.

The accompanying audio message is conveyed to the subscriber either over the CATV or through his telephone. All aspects of the invention are invisible to the subscriber. The invention therefore delivers high quality still video with accompanying audio information to the home, interactively, with utilization of only one channel of the CATV architecture.

Before proceeding further, it will be helpful to define some of the terminology employed in the disclosure and claims.

Definitions

1. CATV: a community antenna television system as presently in use in North America.
2. Subscriber: a user of the CATV or other television transmission system who receives the television signals at his television set in his home.
3. Video frame: the combination of two interleaved video fields, each such field being composed of (1) a plurality of scan lines called the vertical blanking interval (defined below) and (2) a second larger plurality of scan lines containing the video data to be converted to a video image on the television screen. Video frames are transmitted to the CATV at 30 frames/second (North American and Japanese standard) or 25 frames/second (European standard). The invention will be described according to the North American standard transmission rate of 30 frames/second, but operates in the same way at 25 frames/second. A single video frame presents a video-quality still image.
4. Vertical blanking interval: the first 21 lines of a video field, containing coded information to synchronize the presentation of the video image. Several of the lines in the vertical blanking interval are presently left blank and are used in the invention to insert addressing information.

5. Trunk cable: the primary coaxial distribution cable from a CATV central hub.
6. Node: points along a trunk cable at which bridger amplifiers amplify the television signal and split it for transmission down secondary distribution coaxial cables.
7. Distribution cable: a secondary distribution coaxial cable emanating from a node.
8. Tap: a point on a distribution cable where the television signal is split and sent down drop coaxial cables to the subscribers home.
9. Drop: a drop coaxial cable to a subscribers home.
10. Node frame store: a device, located within a multiple node frame store at a node, that can receive and store a video frame and retransmit that frame 30 times/second down the distribution cable. The node frame store also receives the audio message associated with the video frame and transmits this audio in synchronization with the appropriate video frame, both on the same television channel, down its distribution cable.
11. Multiple node frame store: a group of node frame stores, all located at one node, each servicing its unique distribution cable.

The invention contemplates that a CATV transmit a plurality of TV programs on various TV channels in the conventional manner, while using one presently unused channel to transmit video frames to a remote node frame store. The accompanying audio messages are transmitted to the same node frame store over bandwidth available on the trunk cable which is unsuitable for video transmission. At the node frame store, the video and audio are combined for transmission over the same channel (being the channel that was used to transmit the video frames to the node frame store) down the distribution cable to the subscriber. The subscriber will select the desired video and audio presenations from an information "catalogue" that contains, for example, advertising and merchandising information, pricing, and a verbal message or "sales pitch". The cataloque could also contain promotional or educational material. The invention resides in the means by which the video and audio information is transmitted to the subscriber over the CATV at the subscriber's request, and is not related in any way to the specific video and audio information that is so transmitted.

According to the invention, the subscriber requests information by calling a specified telephone number linking him to the control centre. The information is transmitted from the control centre over the trunk cables of the CATV in the form of a video frame on a specified channel and accompanying audio over presently unused portions of the CATV bandwidth. The video frame, which has a duration of 1/30th of a second, has the unique address of the subscribers node frame store inserted in one of the scan lines of its vertical blanking inteval. More than one of the scan lines of the vertical blanking interval may be used for the insertion of such addresses, but the invention will be described as if only one of the scan lines is used. All of the uniquely addressed video frames that have been requested are transmitted over one television channel. The subscribers node frame store recognizes its unique address on the particular video frame requested and stores only that frame in its memory. The accompanying audio is transmitted over unused television bandwidth in the form of radio frequency amplitude modulated audio. The available unused CATV bandwidth can accommodate over 300 discrete audio channels. Each node frame store is tuned to only one of the 300 discrete audio channels. The control centre ensures that the video frame arrives at the node frame store at the same time as the commencement of the accompanying audio. The video frame is then re-transmitted by the node frame store continuously (30 times/second) as a still video frame, along with the accompanying audio, on the same television channel over the node's distribution cable to the subscriber. All subscribers' television sets connected to that distribution cable and tuned to the specified television channel will receive the same still video frame and accompanying audio. The node frame store transmits the accompanying audio message and transmits the video frame continuously until another uniquely addressed video frame has been identified on the trunk cable. The first video frame is then erased and the second video frame is stored for transmission with its appropriate accompanying audio.

The audio can be transmitted from the control centre in one of three alternative ways, the appropriate alternative being selected as the preferred embodiment for a given CATV system application. In the first alternative, the audio may be transmitted through the telephone system to the subscribers telephone. In the second alternative, the audio is transmitted from the control centre to the node frame store as amplitude modulated audio or, in the third alternative, as compressed audio in the electronic format of a video frame. In either the second or third alternatives the audio is converted in the node frame store into a standard television FM audio signal that can be received by the subscriber on the specified channel of his television.

In the preferred embodiment of the invention, the subscriber is able to interact, that is, request specified information. The invention contemplates two interaction paths. The first, and preferred, interaction path is the use of the subscriber's home telephone to call to the control centre. The second interaction path is the CATV; however, two-way cable functionality would be required throughout the CATV and hardware would be required in the subscriber's home to allow the message to travel back from the subscriber through the CATV to the control centre.

PREFERRED EMBODIMENT OF THE INVENTION: CATV System

Specifically, in the preferred embodiment, the invention contemplates in a CATV that includes:
(A) a cable hub for receiving, generating and amplifying a plurality of television signals that are broadcast over predetermined frequency channels;
(B) a trunk cable with one end connected to the cable hub to receive and transmit said signals to;
(C) a plurality of nodes along said cable, each node adapted to convey said signals to;
(D) a bridger amplifier connected to the trunk cable at each node and adapted to amplify and to transmit said signals onto;
(E) a distribution cable for transmitting said amplified signals through;
(F) a tap to a drop cable to a subscriber's home that is adapted for connection to a subscriber's television receiver; an improved system selectively delivering pre-recorded video frames and audio messages, wherein a video frame consists of at least one video field being a first plurality of scan lines representing a video blanking interval, and a second plurality of scan lines representing video picture data;

(G) a central control unit (CPU), located at the cable hub, comprising;
  (1) a central processing unit for co-ordination of all CCU functions;
  (2) a plurality of telephone management units (TMU) that receive telephoned requests from the subscribers and relay those requests to the central processing unit;
  (3) means for generating master synchronization pulses;
  (4) a plurality of video presentation units (VPU) each of which includes:
    (i) a controller (VPU controller) for co-ordinating the activities of the VPU, including prioritizing and scheduling the transmission of video frames and accompanying audio;
    (ii) a video disc player synchronized to the synchronization pulse (3), that stores discrete video frames according to a standard television format, with accompanying audio frames;
    (iii) a plurality of audio frame stores adapted to selectively receive the audio frames associated with a particular video frame from a video player
    (ii) and to convert those audio frames into a modulated analogue signal;
    (iv) means for tuning and transmitting the analogue audio signal onto the trunk cable on a discrete radio frequency, on command;
    (v) a graphics decoder to receive from the central processing unit graphics information associated with a particular video frame and to generate in graphic form such information;
    (vi) a video combiner to receive the video frame from the video player and overlay the graphics information from the graphics decoder onto the video frame;
    (vii) means to insert the encoded address of the subscriber's node frame store onto the vertical blanking interval of the video frame;
    (viii) means for conveying the encoded video frame to;
  (5) a multiplexing switch, responsive to commands from each VPU controller in each VPU, that receives a video frame from a selected VPU and transmits that video frame down the trunk cable; the switch including a scheduler that, in communication with the VPU controller, prioritizes and schedules the transmission of the video frames, then informs the VPU controller that a specified video frame has been transmitted onto the trunk cable so that the VPU controller can command the specified audio frame store to commence transmitting the accompanying audio down the trunk cable;
(H) a node frame store, located at a node, to receive video frames and accompanying audio from the trunk cable and to transmit both onto the distribution cable; the node frame store including
  (1) a television tuner to pass the channel that is carrying the video frames on the trunk cable;
  (2) a channel blocker in parallel with the television tuner to block the channel carrying the video frames on the trunk cable, while allowing other channel frequencies on the trunk to pass onto the distribution cable;
  (3) a node frame store module comprising;
    (i) a radio receiver connected to the trunk, and tuned to the specific radio frequency assigned to that node frame store;
    (ii) a video frame storage means connected to the tuner (1) adapted for the storage and transmission of a video frame;
    (iii) a node frame store processing unit that examines each video frame passed by the tuner and identifies those video frames that are addressed to that particular node frame store, and upon such identification, the video frame storage means is activated to store that video frame;
    (iv) means to modulate both the video frame from the video frame store and audio from the radio receiver onto the same television channel that was used to transmit the video frames to the node frame store, and to transmit both onto the distribution cable, along with the channels passed by the channel blocker.

Alternatively, the video disc player can be any convenient means of storing and retrieving video frames and accompanying audio messages.

In an alternative aspect, only one of the two video fields that comprise a video frame is transmitted by the invention. Since only 1/60th of a second is required to transmit the field, the capacity of the invention is effectively doubled, albeit with some loss of video picture quality.

GENERAL METHOD OF THE INVENTION: NO SPECIFIED TRANSMISSION MEANS

In an alternative aspect, the invention contemplates an improved method of distributing still video frames and accompanying audio interactively through a television distribution system to a subscribers' home television set. The transmission means could include, but is not limited to, transmission and reception by antennae at the distribution point and at the subscriber's home, or transmission to a satellite and retransmission to a satellite "dish" at the subscriber's home, or by use of fiber optic cable instead of coaxial cable. Thirty video frames are delivered each second over a standard television channel. Each video frame, comprised of two interleaved video fields, has a first plurality of scan lines representing a vertical blanking interval. Upon one or more of the scan lines in the vertical blanking interval is inserted a unique address corresponding to a point in the transmission system to which a subscriber is connected. The second plurality of scan lines in the video frame contains the data to generate the video picture image. The improved method comprises the steps of:
(1) selecting
  (i) a primary path for transmission of video frames;
  (ii) a node along that primary path; and
  (iii) a secondary path from the node to a subscriber's television set;
(2) assigning a unique address to the secondary path;
(3) inserting upon a predetermined scan line of the vertical blanking interval of each fram a unique address;
(4) transmitting the video frame with the unique address along the primary path;
(5) examining, on the primary path at the node, the predetermined scan line of the video frame for the unique address;
(6) storing that video frame at the node if the unique address matches the address of the secondary path; and, (7) repetitively transmitting, at least 25 times/second, the video frame stored at the node down the secondary path to the subscriber's television set as a still video frame.

In an alternative and preferable method, there are a plurality of secondary paths to a plurality of subscribers, each group of secondary paths being connected to the primary path at a junction point, or node. In this method, the sampling, storage of video frames and transmission of video frames down secondary paths (5, 6 and 7) occurs at each uniquely addressed node for a discrete group of subscribers.

In a further alternative and preferable method, audio messages that correspond to a particular video frame are transmitted along a discrete route, which in the preferred embodiment is the primary path, to the subscriber. These audio messages can be either amplitude modulated analogue radio or compressed audio in the electronic format of a video frame. If the primary path is not used, then a tertiary path such as a telephone system may be used to transmit the audio messages to the subscriber.

INTERIM VIDEO STORAGE IN A TELEVISION TRANSMISSION SYSTEM: VIDEO FRAME STORE

In another aspect, the invention contemplates a video frame store located in a television transmission system. The video frame store has means to store a single video frame (composed of two interleaved video fields) compatible with a standard television protocol. The video frame is identified by the video frame store by a unique address contained in one or more of the scan lines of the vertical blanking interval of that video frame. The remainder of the scan lines in the video frame contain the data to generate the video picture image. The video frame store samples the video frames passing by the video frame store on a primary path and selects only that frame that contains the unique address of that video frame store, stores that video frame, then transmits it along a secondary path repetitively at least 25 times/second to form a still television video image. The video frame store comprises:

(1) means for examining a primary path for a video frame that has one of the scan lines in its video blanking interval uniquely addressed; and (2) means for storing a video frame and for transmitting the stored video frame repetitively at least 25 times per second onto a second path;

(3) comparator means for comparing the address examined by means (1) and on a match to a predetermined address, activating the storing means (2) to store the video frame from the primary path.

In a preferred embodiment, the video frame store has means to receive from the primary path an audio message to accompany a particular video frame. The audio message is combined with the video frame onto one television channel and both transmitted together on a secondary path to a subscriber. The audio message can be received as either amplitude modulated analogue radio or compressed audio in the electronic format of a video frame.

In a further preferred embodiment, a plurality of video frame stores are located together at a node in the transmission system to service a plurality of secondary paths for economies of scale.

DESCRIPTION OF THE DRAWINGS

The invention will now be described by way of example and reference to the accompanying drawings.

DESCRIPTION OF THE PREFERRED EMBODIMENTS

Figure 1:
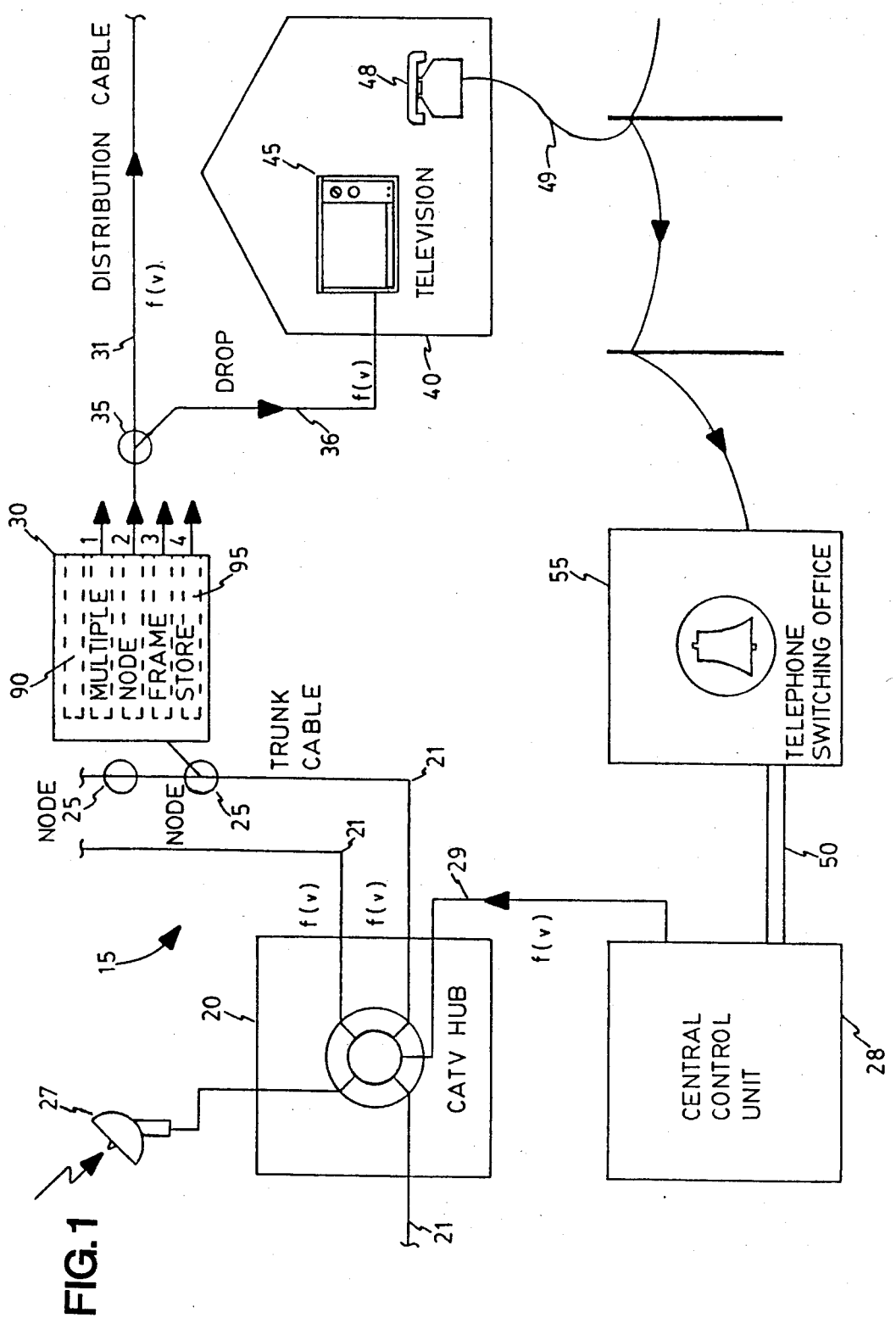
FIG. 1 is a schematic diagram of the components associated with a CATV system, that is modified according to the invention.

Referring to FIG. 1, a CATV system incorporating the preferred embodiment is indicated as 15 and consists of a CATV hub 20 from which three trunk cables 21 emerge as the primary signal paths. Along the trunk cables 21 are a plurality of nodes 25. At each node 25 a bridger amplifier, not shown, is generally located to amplify the television signals and to convey them along a secondary path, a distribution cable 31, to the home 40 of a subscriber. At the node 25', and according to the invention, a multiple node frame store 30 is located which has an output at least one distribution cable 31. Four potential distribution cables 31 connections 1, 2, 3 and 4 are shown, while only number 2 is depicted in use. Similarly, only one mulitple node frame store 30 is shown attached to the node 25'. It will be appreciated that similar multiple node frame stores 30 are to be attached, according to the invention, to each of the other nodes 25 along the trunk cable 21. Along each distribution cable 31, there is a drop connection 35 to a drop 36, in the form of a coaxial cable, extending into the subscriber's residence 40 for connection to a television receiver or set 45. At the CATV hub 20 there are a plurality of television receiving antennas 27, one only being shown.

According to the invention, associated with the CATV hub 20 is a central control unit (CCU) 28. In a preferred embodiment, the CCU 28 is at the same physical location at the CATV hub 20 but this is not necessary so long as the output 29, from the CCU 28, makes connection with the trunk cable 21 in the CATV hub 20. Conveniently, the CCU 28 has a plurality of telephone lines 50 terminating thereat, said telephone lines making other connection to a telephone switching office 55. The subscriber has his residence phone 48 connected to the telephone switching office 55 by his telephone line 49.

Those skilled in the art will appreciate that the signals received by the plurality of television receiving antennas 27 are amplified at the CATV hub 20, and dispatched along the trunk cable 21 on discrete channels, each channel containing a plurality of frequencies of given bandwidth, generally in North America about 6 MHz wide. It is not uncommon that the trunk cable 21 would carry some 20 to 70 different channels of conventional video and audio subband information. The plurality of channels is amplified at the nodes 25 (omitting the multiple node frame store 30 for the moment) and the amplified channel frequencies are conveyed along the distribution cable through a drop connection 35 into dro 36 and hence to the subscriber's television set 45.

According to the invention, in one aspect, the subscriber, by utilizing his telephone 48, communicates directly through the telephone switching office 55 to the CCU 28 by making a normal telephone call. If a "touch tone" set is used, the keypad of the telephone 48 may be used to enter specific requests directly to the CCU 28, as will become apparent.

In the CCU 28, and according to the invention, the keypad information from the telephone 48 causes video frames, consisting of two interleaved video fields, which have been prerecorded and stored on one of a plurality of video players, to be dispatched along the trunk cable 21 to the subscriber's television set 45. In this respect, since there is amplification at the nodes 25, the video frame is first dispatched down the trunk cable 21 to that node 25' to which the subscriber's home 40 also connects. At this node 25' a video frame is stored within the multiple node frame store 30 to be retransmitted continuously 30 times/second to the subscriber's television set 45 along one of the four distribution cables 31, shown as line number 2 in FIG. 1. The time required for conveying the video frame from the CCU 28 to the multiple node frame store 30 for storage is a single frame interval (1/30th of a second). The multiple node frame store 30 retransmits the stored video frame repetitively 30 times/second down the distribution cable 31 for continuous reception by the television set 45 until, appropriately, the multiple node frame store 30 receives from the CCU 28 a new uniquely addressed video frame, wherein the cycle is repeated in a manner which will become apparent.

In summary, therefore, it is apparent that each 1/30th of a second a different video frame may travel down the trunk cable 21. Hence, each second, 30 different nodes can be serviced with a new video frame. Each such node, then, continuously transmits that frame in its multiple node frame store to the subscriber. The subscriber, therefore, "sees" a still video image, while the CCU 28 is continuously dispatching new video frames at each frame interval to other node frame stores. In such application, it is mandatory that there is a master sync generator to synchronize the scan lines and hence the vertical blanking intervals throughout the CATV system.

Figure 2:
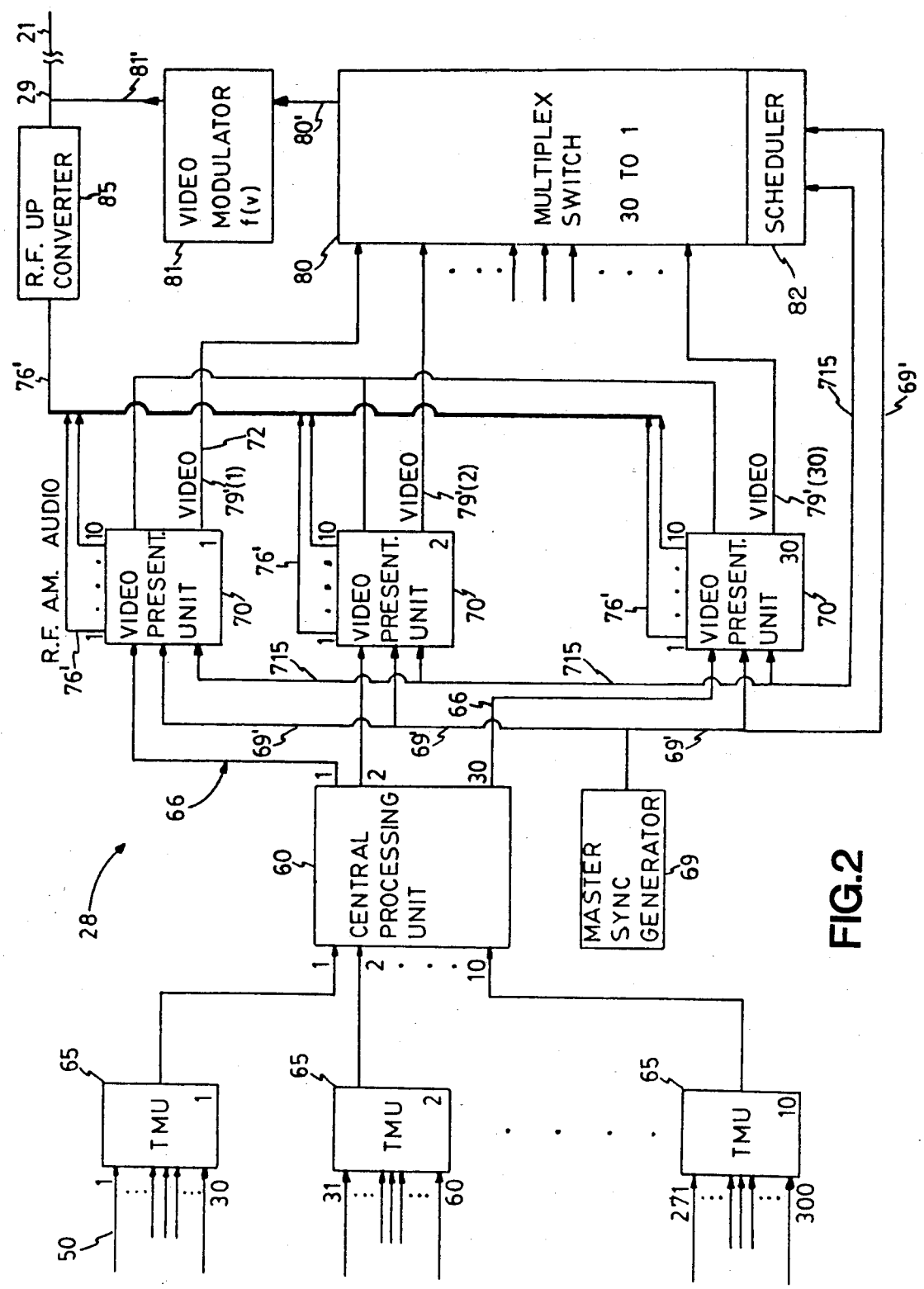
FIG. 2 is a block schematic diagram of a central control unit (CCU) according to the invention.

Referring now to FIG. 2, the CCU 28 comprises a central processing unit 60, with inputs thereto from a plurality of telephone management units (TMU) 65, 10 being shown in all, each TMU 65 schematically depicting the termination of 30 telephone lines 50. The telephone lines 50, of course, terminate at their opposite ends at the telephone switching office 55 of FIG. 1. Each TMU 65 receives instructions from a plurality of subscribers and sends such instructions in an orderly flow to the central processing unit 60.

The central processing unit 60 has a plurality of outputs collectively shown as 66, and diagramatically depicted as being 30 in number, each output presentation connected to a video display unit 70 (VPU). There are 30 VPUs 70, each with its output to a unique port of a multiplexing switch 80, which includes a scheduler 82. There is a master sync generator 69 which passes master sync pulses along paths 69' to each of the video presentation units 70 and to the scheduler 82. In this way, each of the video frames available from the VPUs 70 at each of the input ports 79' may pass effectively through the switch 80 and eventually onto the trunk cable 21. The video frames passing out of the switch 80, on path 80', pass into a video modulator 81 which upconverts the base band video frame to a preselected channel frequency f(v), thence onto trunk cable 21. Similarly, the accompanying audio travels along path 76' to an RF upconverter 85 whose output goes to trunk cable 21.

Figure 3:
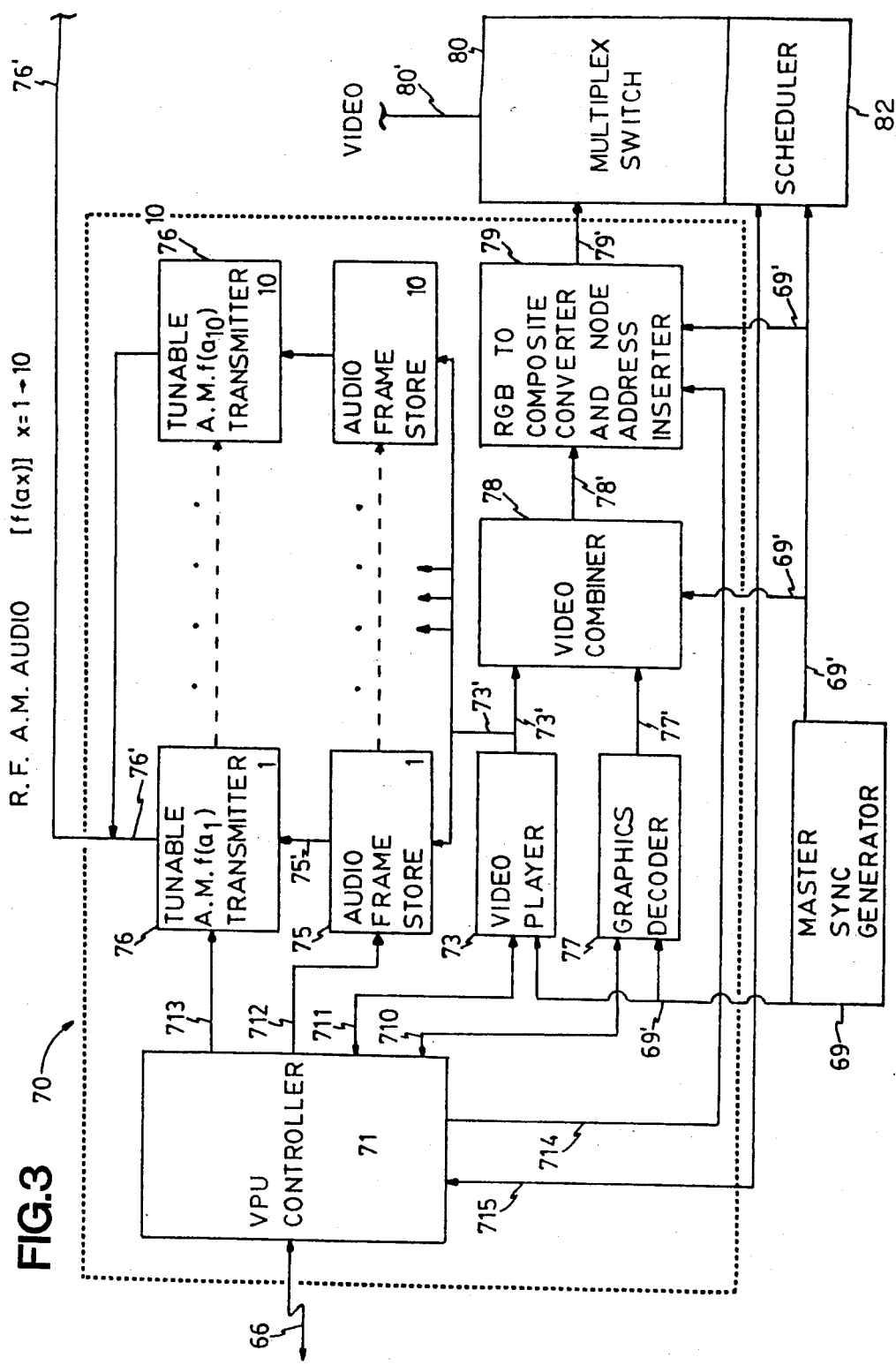
FIG. 3 is a block schematic diagram of one of the video presentation units (VPU) according to the invention.

Referring to FIG. 3, each VPU 70 consists of: a single video presentation controller (VPU controller) 71, that includes integral therewith a programmable microprocessor; a single video player 73; and in parallel, a plurality of audio frame stores 75, preferably 10 in number, with their common input being the output of the video player 73. In the audio frame stores 75, audio digital output from the video player 73 is converted into an analogue signal. The outputs of each audio frame store 75 pass to its own selectably tuned AM transmitter 76 with an output frequency fixed by the VPU controller 71 and established as f(ax) where x is an integer of 1 to 10 within each VDU 70. Outputs from the transmitters 76 pass by common output line 76', and now referring to FIG. 2, through an RF upconverter 85 onto the trunk cable 21.

In parallel with the video player 73 is a graphics decoder 77 with output 77'. A video combiner 78 has as input the output 73' from the video player 73, being composite video, and the output 77' from the graphics decoder 77, being RGB video. The output 78' from the video combiner 78, being RGB video, is input to an RGB to composite video converter and node address inserter 79, that has as a single output, line 79'. Line 79' makes, and referring to FIG. 2, connection to a unique port 79' (s) of the multiplexing switch 80 where s has a value 1 through 30. Referring to FIGS. 2 and 3, the switch 80 includes a scheduler 82 and has a single output line 80' into a video modulator 81 which elevates the base band video on line 80' to a preselected channel frequency f(v) and outputs it onto output line 81' and thence, and referring to FIG. 1, to trunk cable 21.

Referring to FIGS. 2 and 3, there is a master sync generator 69, having communication over line 69' with the scheduler 82 and to each of the video presentation units 70 (specifically to each of the 30 video players 73, the graphics decoder 77, the video combiner 78, and the RGB to composite converter and node address inserter 79) and to the scheduler 82 housed within the multiplexing switch 80.

Similarly, the scheduler 82 is directly connected along path 715 to each of the 30 VPU controllers 71 and exchanges control data therewith. Each VPU controller 71 also has an output line 714 directly to the RGB to composite converter and node address inserter 79 which inserts a "unique node address" upon a predetermined scan line within the vertical blanking interval of each video field in the video frame. As additional outputs, the VPU controller 71 has line 711 to the video player 73, line 712 to each of the audio frame stores 75 and line 713 to each of the tunable AM transmitters 76.

Figure 4:
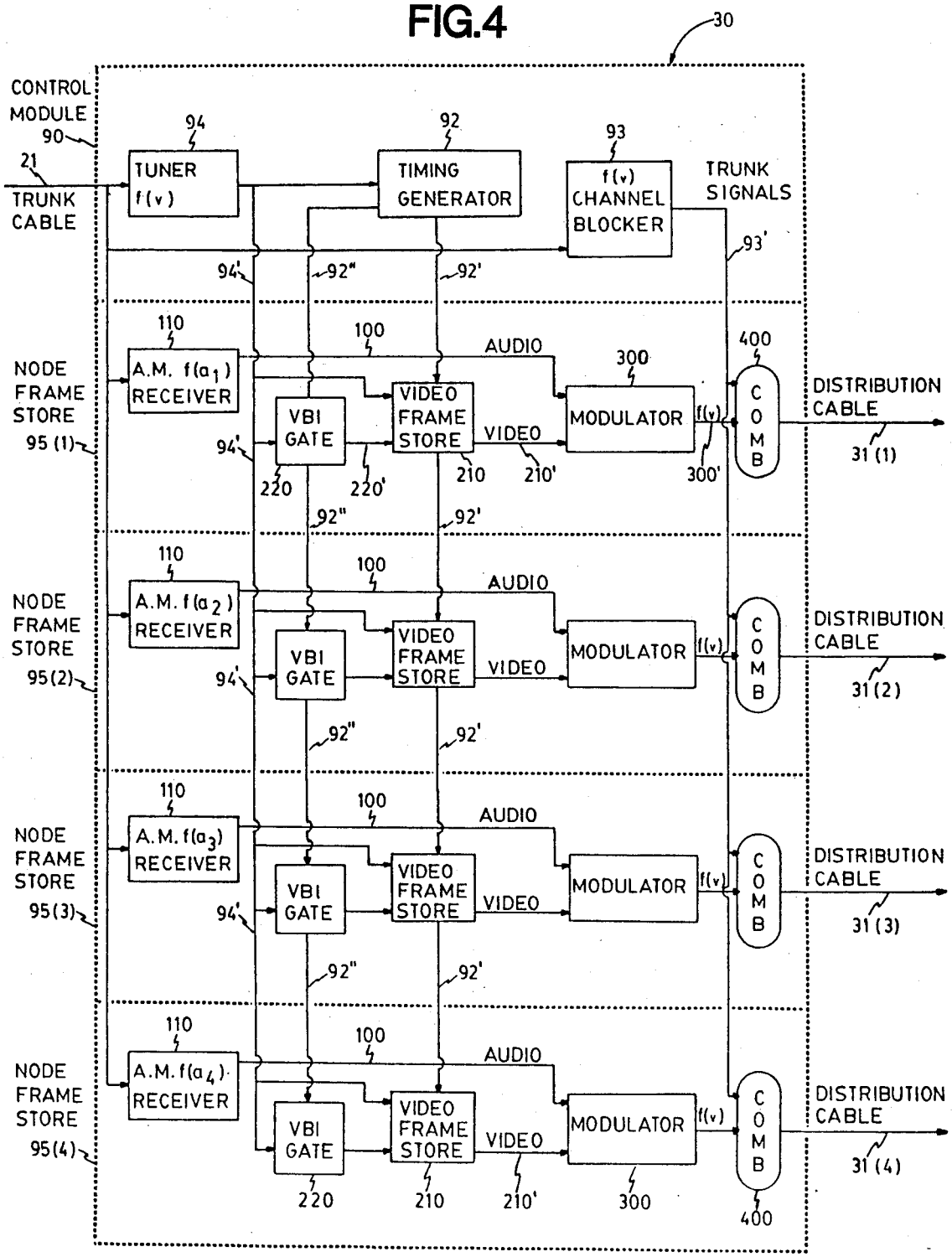
FIG. 4 is a block schematic diagram of a node frame store, that is located at a node, according to the invention FIG. 5(A&B) is a block schematic diagram of an alternative embodiment, according to the invention, for conveying audio down the primary path to the node frame store.

Referring to FIGS. 1 and 4 for a moment, there are a plurality of multiple node frame stores 30 each containing one or more node frame stores 95, each of which has been assigned a unique address. When a video frame is located on a given video player 73 and that prerecorded frame is to be sent to the television set 45, the specific address of the node frame store 95 within the muliple node frame store 30 at node 25' in FIG. 1 must be used. Therefore, that specific address which is contained within the memory of the central processing unit 60 is passed to the VU 70 that contains the video player 73 with the specific video frame requested by the subscriber. We will assume, for example, it is the video player 73 in VPU number 1 in FIG. 3. The node frame store address is passed to the VPU controller 71 along line 66 and that address passed by the VPU controller 71 along line 714 to the RGB to composite converter and node address inserter 79. Simultaneously, along line 711, the video frame within video player 73 is selected along with its accompanying audio frame(s), and the video and audio frames passed along path 73' to the video combiner 78 and to one of the audio frame stores 75(1) through 75(10). The VPU controller 71 selects which audio frame store is "free" then passes an enabling pulse along line 712 to the appropriate audio frame store 75 to store only the appropriate audio frame(s). The audio frame store 75 translates the audio frame(s) into analogue audio and, on command from the VPU controller 71, conveys it onto line 75' as input to its own tunable AM transmitter 76. The VPU controller 71, through line 713, sets the AM transmitter frequency f(ax) to that of the AM receiver in the node frame store 95. It is convenient, however, to upconvert all transmitter outputs 76' and this is done by an R.F. upconverter 85.

In the memory of the VPU controller 71, as well, may be a "graphics overlay" associated with that specific video frame selected. This overlay, if any, is passed along line 710 to the graphics decoder 77 which reconstitutes it as RGB video and passes it as output along line 77' into the video combiner 78. The graphics overlay then is placed onto the video frame within the video combiner 78 and the combined RGB output passed along line 78' into the RGB to composite converter and node address inserter 79. The video frame is composed of 2 video fields, each field composed of a first plurality of scan lines representing the vertical blanking interval, and a second plurality of scan lines representing the video picture data. One of the scan lines in the vertical blanking interval is preselected to carry the node address, and the RGB to composite converter and node address inserter 79 accepts the node address from the VPU controller 71 along line 714 and places it on the designated scan line of the vertical blanking interval of that video frame. The uniquely addressed RGB video frame is converted to composite video and then passes along the line 79' to a specific port of the multiplexing switch 80. On the appropriate signal from the VPU controller 71 to the scheduler 82, the multiplexing switch is opened for that specific port and the addressed video frame is passed to the output 80' of the switch. The scheduler 82 then passes the appropriate signal to the VPU controller 71 indicating that the video frame has passed along line 80' to the trunk cable 21. At each frame interval this sequence may be repeated. Therefore on the path 80' at each 1/30th of a second, there may be transmitted a different video frame with a different node address. These signals are all base band frequencies and hence pass through, and referring to FIG. 2, the video modulator 81 which elevates the base band to the predesignated frequency f(v) as heretofore explained. The scheduler 82 does not allow any audio frames through the multiplexing switch 80.

It will be seen therefore, that the path 715 between scheduler 82 and VPU controller 71 is bi-directional, as are the paths 710 and 711, while the paths 712 and 713 need not be.

Video players 73, according to the present art, have a response time of approximately 1 second. Therefore, in order to ensure that each 1/30th of a second interval can be serviced with a unique video frame, there are at least 30 different VPUs 70, each VPU operative once each second. This satisfies the North American and Japanese environments where 30 video frames occur each second. If the response time of the video players is slower, then the plurality of video presentation units 70 must be increased in order to have the same video frame frequency of response per second; similarly, if faster response times of video players are available, there may be fewer video presentation units 70. The plurality of video presentation units 70 may also be increased to allow multiple access to the same information which is in high demand, or to provide a broader range of information in the information "pool".

Now referring to FIGS. 2 and 3, each of the VPU controllers 71 connects to the central processing unit 60 and that central processing unit 60 will initiate, in the appropriate fashion, activation of the appropriate VPU controller 71 of each of the video presentation units 70. The VPU controller 71 impresses the node frame store address onto the given video frame for passage through the multiplexing switch 80. The scheduler 82, on command from the VPU controller 71, then selects that video frame for dispatch through the multiplexing switch 80 onto the trunk cable 21.

From the aforesaid, it will be clearly seen that according to the preferred embodiment of the invention there are at least 30 video presentation units 70, each with their respective VPU controller 71, video player 73, audio frames stores 75, tunable AM transmitters 76, graphics decoder 77, video combiner 78, and RGB to composite converter and node address inserter 79. The output from all of the RGB to composite converters and node address inserters 79 within the plurality of video presentation units 70 jointly terminates at their respective unique input ports of the multiplexing switch 80. Each of the 30 VPU controllers 71 has its individual input line 66 addressed by the central processing unit 60.

In the foregoing, it will now be apparent that the scheduler 82 communicates with each VPU controller 71 in each VPU 70 and it co-ordinates the passing of each video frame from the input ports 79' to the output port 80'. The scheduler, therefore, receives a "go pulse" from the appropriate VPU controller 71 and sends a "done" pulse to the same VPU controller after the video frame has been passed through the multiplexing switch 80. Thereafter, the VPU controller 71 sends the accompanying audio message associated with the video frame just sent. The cycle is repeated every 1/30th of a second permitting different VPUs 70 to send their uniquely addressed video frames through the multiplexing switch 80, then send the audio message associated with each video frame.

Now at each of the plurality of nodes 25 along trunk cable 21, there is a multiple node frame store 30 according to FIGS. 1 and 4. The multiple node frame store 30 consists of a single control module 90 with one or more node frame store modules 95, each of the node frame store modules 95(n) communicating it's respective output to its own distribution cable 31(n), where (n) is an integer, 1, 2, 3 or 4 or such greater number as corresponds to the number of distribution cables. It will be seen, therefore, that at any node 25, the "minimum" environment is for a multiple node frame store 30 to consist of single control module 90 and a single node frame store module 95.

Referring now to the control module 90, it includes a tuner 94, tuned to the dedicated preselected channel frequency f(v), as its input from the trunk cable 21. In parallel with the tuner 94 is a notch filter or channel blocker 93 that passes as its output 93' all other channel frequencies on the trunk cable 21, except f(v). The output 93' of the channel blocker 93 is passed to the output path of all the node frame store modules 95 within the frame store 30 as will be explained.

The output of the tuner 94 detects channel f(v). This output is passed to a timing generator 92 which has two outputs to each of the node frame store modules 95. The first output is a clock along path 92' to each video frame store 210. The second output is gate pulses for vertical synchronizing along path 92" to each vertical blanking interval gate (VBI gate) 220. The clock may be any convenient multiple of the horizontal sync on channel f(v).

Referring to a single node frame store module 95, there are two paths therein, an audio path and a video path. The audio path is in parallel with the tuner 94 and consists of an AM RF receiver 110 with a fixed tuner frequency of f(ax). The input of the receiver 110 connects directly to the trunk cable 21 and the output of the receiver 110 is detected audio which is conveyed along path 100 to the input of the modulator 300 whose output frequency is a reconstructed channel f(v). This f(v) output is conveyed along path 300' to a RF combiner 400 which has as an additional input, the output of the channel blocker 93. Path 93' therefore conveys to the combiner 400 all the channels that were on the trunk cable 21, other than channel f(v). The video path 94' of the node frame store module 95 includes a video frame store 210 whose output is video frames that have been stored that pass along path 210' to the modulator 300. The audio and video inputs to the modulator 300 are mixed whereby the audio becomes the FM audio subband of channel f(v) and the video becomes the video subband of the same channel f(v); the modulator 300 outputs channel f(v) onto one of the inputs of the combiner 400. The output from the combiner 400 is the secondary path, the distribution cable 31, carrying the reconstructed channel f(v) and all remaining channels from the trunk cable 21.

In order to accomplish the foregoing, a video blanking interval gate (VBI gate) 220 has its output 220' as one of the inputs to the video frame store 210. All video frame stores 210 have as another input the output of the tuner 94 along path 94'. Each of the individual VBI gates 220 of each of the node frame store modules 95(n) has a unique address, and when the appropriate scan line in the vertical blanking interval contains that address, the VBI gate 220 (1), for example, initiates its video frame store 210(1) to "store" that video frame which is at the output of the tuner 94. The next immediate vertical blanking interval at the tuner 94 output will contain an address other than the address for the VBI gate 220(1) and hence that video frame is not accepted by the VBI gate 220(1). The video frame, once stored within the video frame store 210(1) is continuously transmitted 30 times/second on the video path 210' to the modulator 300 and thence onward as heretofore described onto the distribution cable 31(1).

Each of the plurality of node frame store modules 95(n) has its AM receiver 110 fix-tuned to a unique RF frequency f(ax) and the VBI gate 220 assigned a unique address. The appropriate table of AM RF receiver frequencies of the frame store modules 95(n) and the address of each of the VBI gates 220 in each node frame store module 95(n) are stored at the CATV hub 20 within the central processing unit 60 in the central control unit 28.

In summary, then, when the subscriber calls in on his telephone 48 to the central control unit 28, his call is conveyed through one of the telephone management units 65 directly to the central processing unit 60, should he have a touch tone telephone. If the subscriber does not have a touch tone telephone, a converter can convert the pulses to touch tone, or some other means could be used to receive and input the necessary instructions into the central processing unit 60. The subscriber may ask to review various types of merchandise which are sold by various vendors. The various catalogues of these vendors have been placed as individual frames on the video players and, if desired, associated with audio frames. When the central processing unit 60 activates a video presentation unit 70, the appropriate video player 73 is activated to retrieve the required video frame and accompanying audio frame(s). The video frame passes as heretofore explained to the multiplexing switch 80. At the modulator 81, the video frame is impressed upon a preselected channel f(v), for example, channel 35, and eventually passed to the trunk cable 21. Hence the output of all video display units 70 is on a given channel f(v). Thus, 30 different frames can be transmitted on the CATV by the video presentation units 70 in any given second when, for example, the North American and Japanese video transmission standard is used. The audio frame(s) associated with each video frame are converted to amplitude modulated audio and transmitted on the trunk cable 21 at a discrete frequency f(ax) which is not otherwise used for the video channels.

Figure 5A:
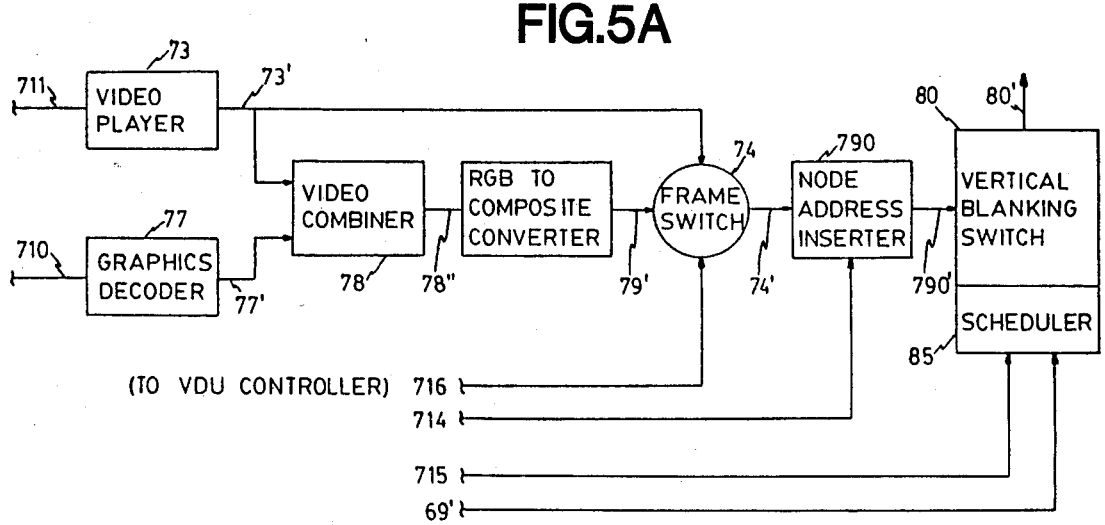
Figure 5B:
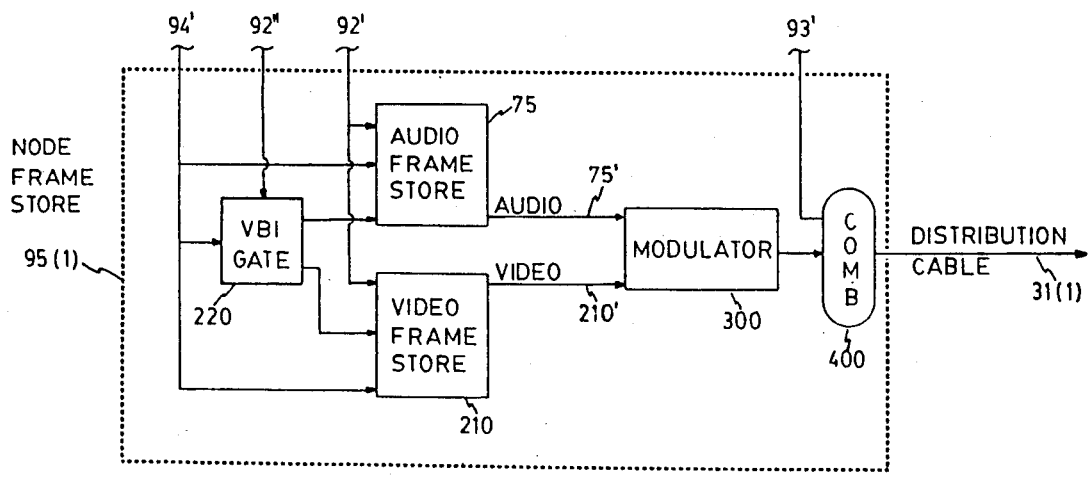

Referring to FIG. 5A, an alternative mode of transmitting audio is for the video player 73 to pass the audio frame along path 73' as compressed audio in the electronic format of a video frame. Referring to FIG. 5B, in the node frame store 95 there is located the audio frame store 75 which replaces the AM RF receiver 110. In that application, the need for transmitters 76 in the VPUs 70, and for an AM RF receiver 110 in the node frame store 95 is avoided. Thus from video player 73, the audio frame passes along path 73' each 1/30th of a second to a frame switch 74 which allows video frames or audio frames through the switch one at a time. The frame switch 74 is controlled by the VPU controller 71 through path 716. Since the audio frames must also be addressed in their vertical blanking interval with a unique address, the node address inserter 790, previously part of the RGB to composite converter and node address inserter 79, is now moved and placed after the frame switch 74 along path 74'. The node address inserter 790 inserts the appropriate unique address into both video and audio frames. Both video and audio frames are then conveyed from the node address inserter 790 along path 790' to the unique port of the multiplexing switch 80 and out port 80' through the video modulator, not shown, and down trunk cable 21 to the multiple node frame store 30. The multiple node frame store 30 has its control module 90 in accordance with FIG. 4, but the node frame store module 95 is configured in accordance with FIG. 5B and includes the audio frame store 75 having as input the output of the tuner 94, and, in parallel, VBI gate 220 which performs the same function for the audio frame store as the VBI gate 220 performs for the video frame store. The output of the audio frame store 75 is analogue audio and passes along path 75' to the modulator 300 and thence to the combiner 400 and as before, combined with all channels and output on distribution cable 31.

As an alternative, it is not necessary to transmit the audio over the same path as the video frames, but the audio can be transmitted through the telephone system to the subscriber's telephone, or via any other transmission means.

Referring to the invention in general, those skilled in the art will appreciate that the location of the node frame store module 95 may be at a node 25 but in fact could be at the subscriber's television set 45 as well.

Figure 6A:
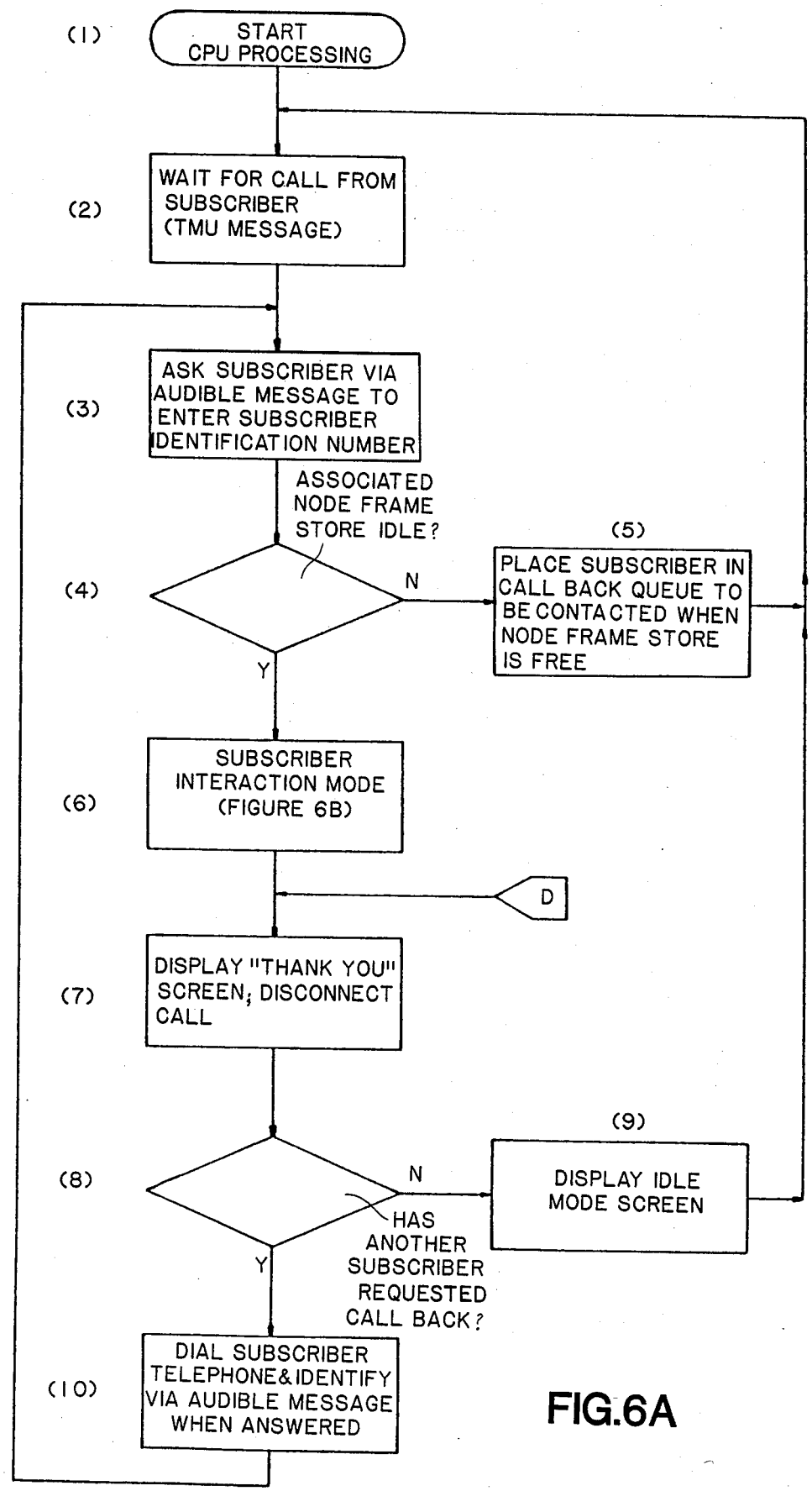
FIG. 6(A&B) is a flow chart of the operation of the central processing unit (CPU) in the central control unit (CCU), according to the invention.

Referring to FIG. 6A, the flow chart depicts a cycle of operation of the central processing unit 60 in the CCU 28. Box 1 is the "on-off" switch mechanism. Box 2 receives as input the output of the Telephone Management Units 65. When a subscriber's telephone call is received, Box 3 asks the subscriber, using a computer-generated voice, to enter the subscriber's personal identification number by pushing the appropriate buttons on their touch-tone phone. In Decision Box 4, if the node frame store 95 serving that subscriber is busy, the subscriber is put in a call-back queue, Box 5, until the node frame store is available. If the subscriber's node frame store is available, Box 6, Subscriber Interaction Mode, is initiated, as will be explained below with refernce to Figure 6B. When the subscriber has finished requesting information, Box 7 displays a "Thank you" frame on the subscriber's T.V. screen and disconnects the call. Decision Box 8 ask if another subscriber has been put in the call-back queue: if yes, that subscriber is called and notified that the service is calling back and the sequence is initiated again at Box 3. If no other subscriber is in the call-back queue, Box 9 displays a "System ready" message at the subscriber's node frame store and eturns to Box 2 to wait for a new incoming subscriber call.

Figure 6B:
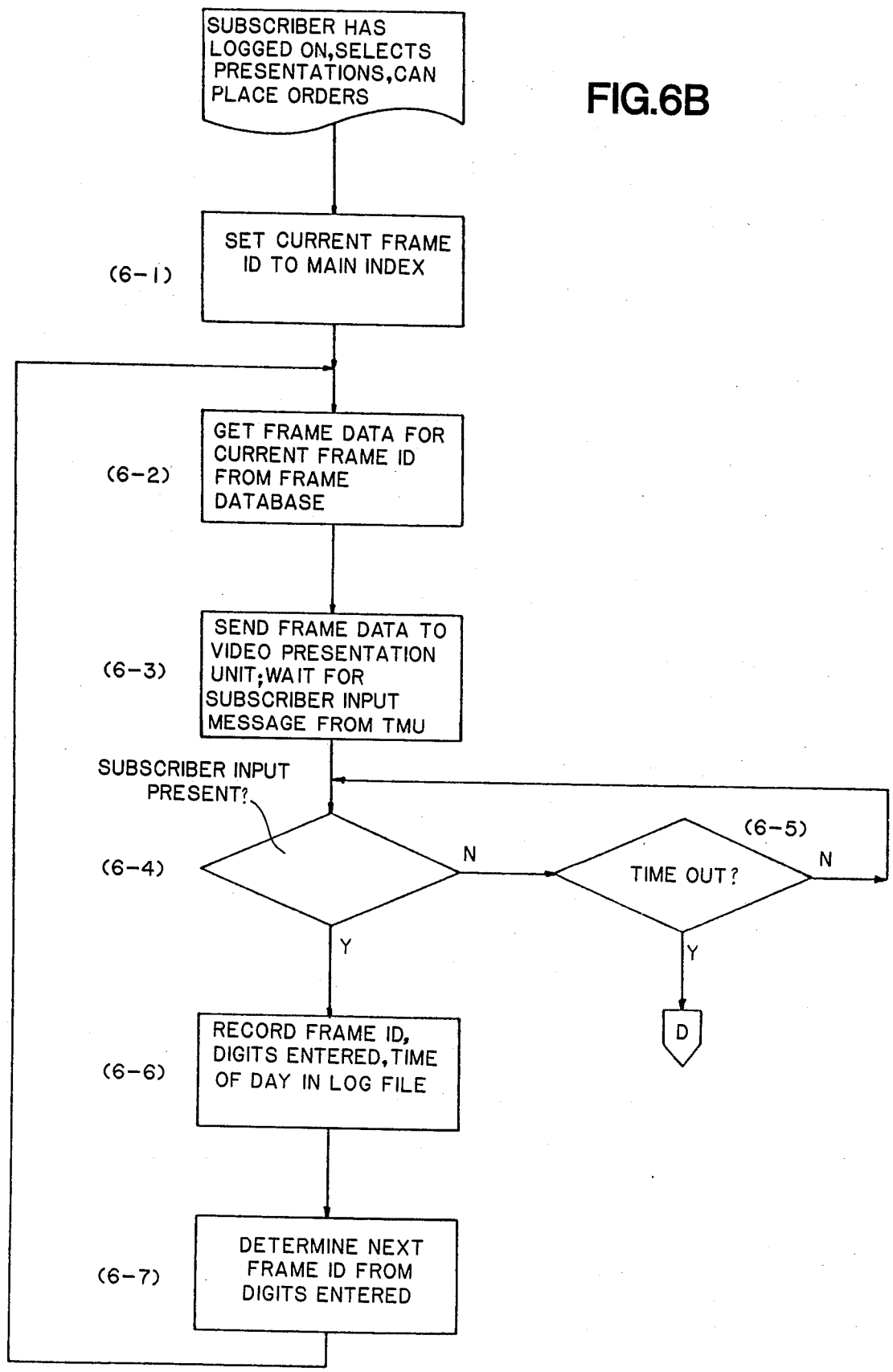

Referring now to FIG. 6B, it shows a cycle of operation within Box 6, Subscriber Interaction Mode. When the subscriber's node frame store 95 is available, Box 6-1 sets the initial frame identification to the main index page. Box 6-2 selects from the central processing unit memory the frame data for the next frame (either main index page or a frame that has been requested by the subscriber in Box 6-7.) Box 6-3 then sends the frame data to the VPU 70 and waits for a subscriber request. If there is a request, Decision Box 6-4 initiates Box 6-6 to record the initial requst for statistical purposes, then Box 6-7 determines the identity of the next requested frame and initiates the cycle again at Box 6-2. If there are no further requests, Box 6-4 instructs Decision Box 6-5 to wait a predetermined time and then time-out, and the cycle is initiated again at Box 7 in FIG. 6A.

Figure 7A:
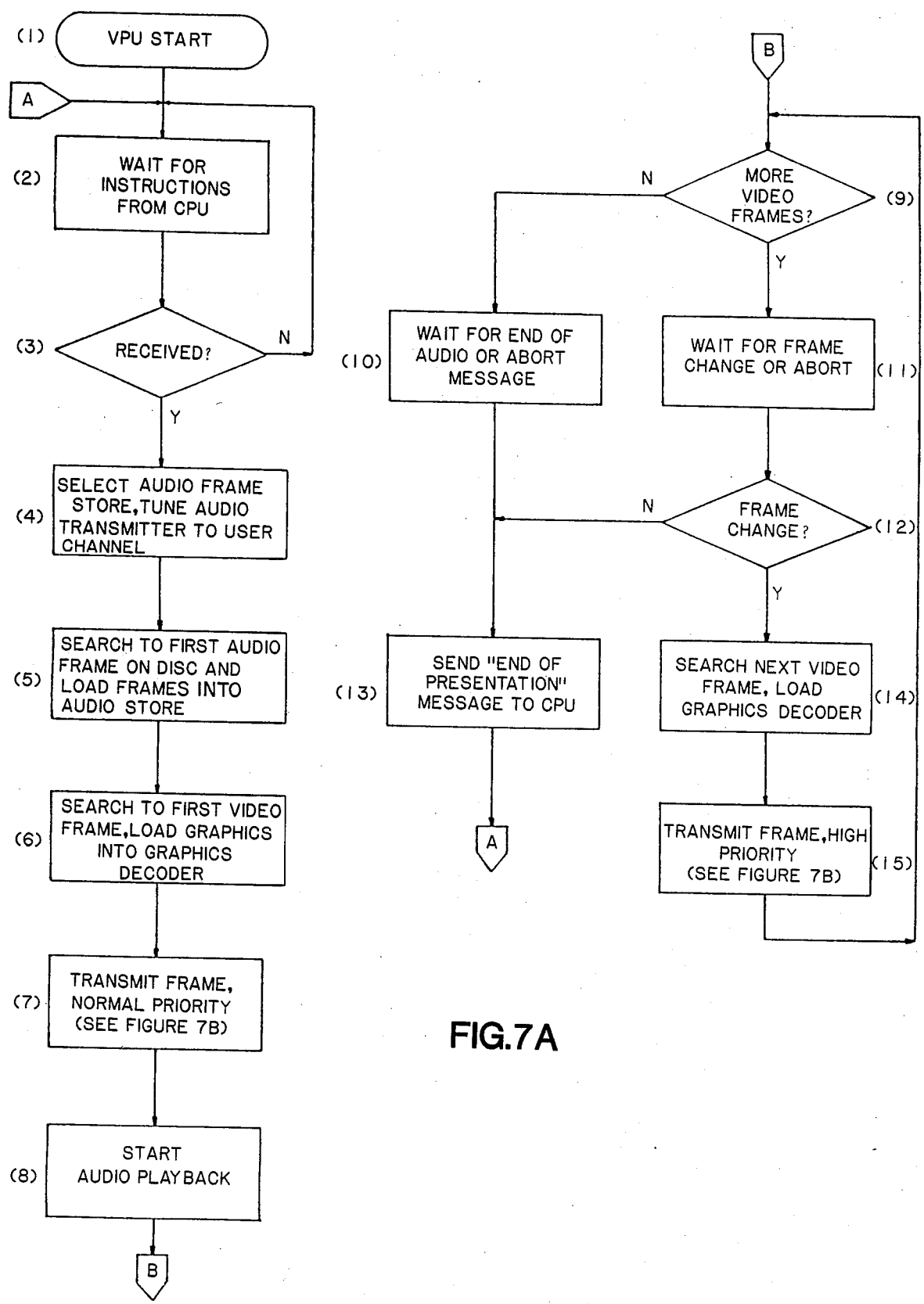
FIG. 7(A&B) is a flow chart of the operation of the VPU Controller in the video dispay unit (VPU), according to the invention.

Referring to FIG. 7A, the flow chart depicts a cycle of operation of the VPU controller 71 in the VPU 70. Box 1 is the "on-off" switch mechanism. Box 2 receives instructions from the central processing unit 60 (Box 6 in FIG. 6A) and upon receipt of an instruction, Decision Box 3 sends that instruction to Box 4. Box 4 selects an unused audio frame store 75(n) within the VPU 70 and tunes its transmitter 76 to the frequency assigned to the subscriber's node frame store 95. Box 5 then searches the video disc on the video disc player 73 within the VPU 70 for the audio frame(s) associated with the subscriber's request and transmits the frame(s) to the previously selected audio frame store 75(n). Box 6 then searches the video disc for the video frame requested by the subscriber, and also loads any associated graphics into the graphics decoder 77. Box 7 then transmits the video frame onto the trunk cable, as "normal" priority. "Normal" priority is used when the frame requested by the subscriber is the first frame of a series of frames forming one presentation. "High" priority is used when the requested frame is the second, third, fourth, etc. frame within a presentation - the transmission of such frames has precedence over "normal" priority frames in order to maintain the continuity of the presentation in synchronization with the audio message. (Box 7 is described in detail in FIG. 7B and below.) Once the video frame has been transmitted, Box 8 transmits the audio onto the trunk cable. Decision Box 9 asks if more video frames are to be transmitted as part of the presentation. If no, Box 10 waits for the end of the audio message, or the reception of an abort message from the subscriber, and Box 13 sends an "end of presentation" message to the central processing unit 60 and the cycle is initiated again at Box 2. In Decision Box 9, if there are more video frames in the presentation, then Box 11 waits for either the commencement of the next video frame ("frame change") or the reception of an abort command from the subscriber. If an abort command is received, Decision Box 12 initiates Box 13 to send an "end of presentation" message to the central processing unit 60 and initiate the cycle again at Box 2. If a frame change message is received, Decision Box 12 initiates Box 14 to search for the next video frame in the presentation and load its graphics into the graphics decoder. Box 15 then transmits that video frame at "high" priority, to preserve the continuity of the presentation, and the cycle is initiated again at Decision Box 9, continuing until the presentation is completed or aborted.

Figure 7B:
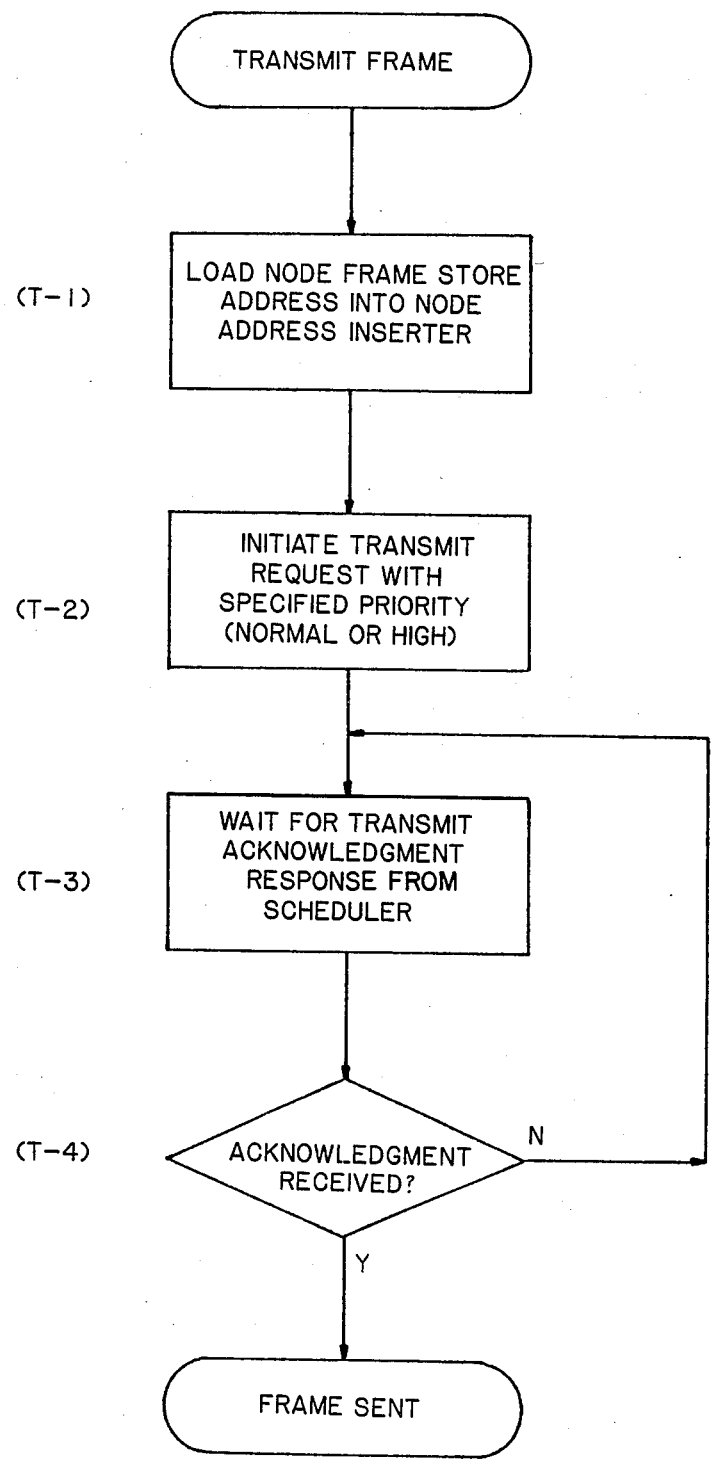

Referring to FIG. 7B, the "Transmit Frames" sequence Boxes 7 and 15 of FIG. 7A begin their internal operation at Box T-1 by loading the subscriber's node frame store address into the RGB to composite converter and node address inserter 79. Box T-2 initiates the transmit request with the specified priority (Box 7=normal, Box 15=high). Box T-3 waits for a tranmission acknowledgement response from the Scheduler 82 in the multiplexing switch 80. When the acknowledgement has been received in Box T-4, the frame has been sent and the cycle continues out of Box 7 into Box 8 if normal priority, or out of Box 15 into Box 9 if high priority.

We claim:
1. In a cable antenna television system that includes:
(A) a cable hub for receiving, generating and amplifying a plurality of television signals that are broadcast over predetermined frequency channels;
(B) a trunk cable with one end connected to the cable hub to receive and transmit said signals to;
(C) a plurality of nodes along said cable, each node adapted to convey said signals to;
(D) a bridger amplifier connected to the trunk cable at each node and adapted to amplify and to transmit said signals onto;
(E) a distribution cable for transmitting said amplified signals through;

(F) a tap to a drop cable to a subscriber's home that is adapted for connection to a subscriber's television receiver; an improved system selectively delivering pre-recorded video frames and audio messages, wherein a video frame consists of at least one video field being a first plurality of scan lines representing a video blanking interval, and a second plurality of scan lines repesenting a video picture data;

(G) a central control unit (CCU), located at the cable hub, comprising;

(1) a central processing unit for co-ordination of all CCU functions;

(2) a plurality of telephone management units (TMU) that receive telephoned requests from the subscribers and relay those requests to the central processing unit;

(3) means for generating master synchronization pulses;

(4) a pluarlity of video presentation units each of which includes;

(i) a controller for coordinating the activities the presentation unit, including prioritizing and scheduling the transmission of video frames and accompanying audio messages;

(ii) a video disc player synchronized to the synchronization pulses (3), that stores discrete video frames according to a standard television format, with accompanying audio frames;

(iii) a plurality of audio frame stores adapted to selectively receive the audio frames associated with a particular video frame from a video player (ii) and to convert those audio frames into a modulated analogue signal;

(iv) means for tuning and transmitting the analogue audio signal onto the trunk cable on a discrete radio frequency, on command;

(v) a graphics decoder to receive from the central processing unit graphics information associated with a particular video frame and to generate in graphic form such information;

(vi) a video combiner to receive the video frame from the video player and overlay the graphics information from the graphics decoder onto the video frame;

(vii) means to insert an encoded address of a node frame store for a designated subscriber onto the vertical blanking interval of the video frame;

(viii) means for conveying the encoded video frame to;

(5) a multiplexing switch, responsive to commands from each conroller in each presentation unit, that receives a video frame from a selected presentation unit and transmits that video frame down the trunk cable; the switch including a scheduler that, in communication with the controller, prioritizes and schedules the transmission of the video frames, then informs the controller that a specified video frame has been transmitted onto the trunk cable so that the can command the specified audio frame store to commence transmitting the accompanying audio messages down the trunk cable;

(H) a node frame store, located at a node, to receive video frames and accompanying audio messages from the trunk cable and to transmit both onto the distribution cable; the node frame store including (1) a television tuner to pass a predetermined channel that is carrying the video frames on the trunk cable;

(2) a channel blocker in parallel with the television tuner to block the channel carrying the video frames on the trunk cable, while allowing other channel frequencies on the trunk to pass onto the distribution cable;

(3) a node frame store module comprising;

(i) a radio receiver connected to the trunk cable, and tuned to a specific radio frequency assigned to that node frame store module;

(ii) a video frame storage means connected to the tuner (1) adapted for the storage and transmission of a video frame;

(iii) a node frame store processing unit that examines each video frame passed by the tuner and identifies those video frames that are addressed to that particular node frame store, and upon such identification, the video frame storage means is activated to store that video frame;

(iv) means to modulate both the video frame from the video frame store and the audio messages from the radio receiver onto the same television channel that was used to transmit the video frames to the node frame store, and to transmit both onto the distribution cable, along with the channels passed by the channel blocker.

2. The system as claimed in claim 1, including a plurality of node frame stores located at a given node, each node frame store processing unit having a unique address.

3. The system as claimed in claim 1, including (a) a plurality of nodes spatially disposed on the trunk cable; and, (b) a plurality of node frame store modules located at each of the spatially disposed nodes, each node frame store processing unit having a unique address.

4. The system as claimed in claim 1, 2 or 3, wherein (a) the video disc player stores two interleaved fields as a video frame according to the standard television format and means (G(4)vii) encodes the address of the subscriber's node frame store module onto one of the vertical blanking intervals of the video frame;

(b) the multiplexing switch (5) passes two interleaved video fields as a video frame; and, (c) the node frame store module receives two interleaved video fields as a video frame.

5. The system as claimed in claim 4, wherein step (a) encodes the address of the subscriber's node frame store module onto one of the vertical blanking intervals of each interleaved field of the video frame.

6. The system as claimed in claims 1, 2 or 3, wherein (a) the video disc player stores two interleaved fields as a video frame according to the standard television format and means (G(4)vii) encodes the address of the subscriber's node frame store onto one of the vertical blanking intervals of the video frame;

(b) the multiplexing switch (5) passes, at least every 1/25th of a second, two interleaved video fields as a video frame; and, (c) the node frame store module receives two interleaved video fields as a video frame.

7. The system as claimed in claims 2 or 3, wherein the radio in each node frame store module is tuned to a different predetermined radio frequency.

8. In a cable antenna television system that includes:
(A) a cable hub for receiving, generating and amplifying a plurality of television signals that are broadcast over predetermined frequency channels;
(B) a trunk cable with one end connected to the cable hub to receive and transmit said signals to;
(C) a plurality of nodes along said cable, each node adapted to convey said signals to;
(D) a bridger amplifier connected to the trunk cable at each node and adapted to amplify and to transmit said signals onto;
(E) a distribution cable for transmitting said amplified signals through;
(F) a tap to drop cable to a subscriber's home that is adapted for connection to a subscriber's television receiver; an improved system selectively delivering pre-recorded video frames and audio messages, wherein a video frame consists of at least one video field being a first plurality of scan lines representing a video blanking interval, and a second plurlity of scan lines representing a video picture data;
(G) a central control unit (CCU), located at the cable hub, comprising;
(1) a central processing unit for co-ordination of all CCU functions;
(2) a plurality of telephone management units (TMU) that receive telephoned requests from the subscribers and relay those requests to the central processing unit;
(3) means for generating master synchronization pulses;
(4) a plurality of video presenation units each of which includes;
(i) a controller for coordinating the activities of the presentation unit, including prioritizing and scheduling the transmission of video frames and accompanying audio messages;
(ii) a video disc player synchronized to the synchronization pulses (3), that stores discrete video frames according to a standard television format, with accompanying audio frames;
(iii) a graphics decoder to receive from the central processing unit grapics information associated with a particular video frame and to generate in graphic form such information;
(iv) a video combiner to receive the video frame from the video player and overlay the graphics information from the graphics decoder onto the video frame;
(v) means connecting to the video combiner and to the video disc player, for switching between the video disc player for audio frames, and the video combiner for video frames;
(vi) means to insert an encoded address of a node frame store for a designated subscriber onto the vertical blanking interval of the video frame;
(vii) means for conveying the encoded video frame to;
(5) a multiplexing switch, responsive to commands from each controller in each presenation unit, that receives a video frame from a selected presentation unit and transmits that video frame down the trunk cable; the switch including a scheduler that, in communication with the controller, prioritizes and schedules the transmission of the frames, then informs the controller that specified frames have been transmitted onto the trunk cable;
(H) a node frame store, located at a node, to receive video frames and accompanying audio messages from the trunk cable and to transmit both onto the distribution cable; the node frame store including
(1) a television tuner to pass a predetermined channel that is carrying the video frames on the trunk cable;
(2) a channel blocker in parallel with the television tuner to block the channel carrying the video frames on the trunk cable, while allowing other channel frequencies on the trunk to pass onto the distribution cable;
(3) a node frame store module comprising;
(i) an audio frame storage means, connected to the tuner (1), to receive audio frames and to convert those audio frames into an analogue audio signal;
(ii) a video frame storage means connected to the tuner (1) adapted for the storage and transmission of a video frame;
(iii) a node frame store processing unit that examines each video frame passed by the tuner and identifies those video frames that are addressed to that particular node frame store, and upon such identification, the video frame storage means is activated to store that video frame;
(iv) means to modulate both the video frame from the video frame store and the analogue audio from the audio frame store onto the same television channel that was used to transmit the video frames to the node frame store;
(v) means to transmit onto the distribution cable, along with the channels passed by the channel blocker, the channel created by means (3(iv)).

9. The system as claimed in claim 8, including a plurality of node frame stores located at a given node, each node frame store processing unit having a unique address.

10. The system as claimed in claim 8, including
(a) a plurality of nodes spatially disposed on the trunk cable; and
(b) a plurality of node frame store modules located at each of the spatially disposed nodes, with each node frame store processing unit having a unique address.

11. The system as claimed in claims 8, 9, or 10, wherein
(a) the video disc player stores two interleaved fields as a video frame according to the standard television format and means (G(4)(vi)) encodes the address of the subscriber's node frame store module onto one of the vertical blanking intervals of the video frame;
(b) the multiplexing switch (5) passes two interleaved video fields as a video frame; and,
(c) the node frame store module receives two interleaved video fields as a video frame.

12. The system as claimed in claims 8, 9, or 10, wherein
(a) the video disc player stores two interleaved fields as a video frame according to the standard television format and means (G(4)(vi) encodes the address of the subscriber's node frame store onto one of the vertical blanking intervals of the video frame;

(b) the multiplexing switch (5) passes, at least every 1/25th of a second, two interleaved video fields as a video frame; and (c) the node frame store module receives two interleaved video fields as a video frame.

13. The system as claimed in claims 8, 9, or 10, wherein means (G(4)(vi)) also inserts the address onto the vertical blanking interval of the audio frame and means (H(3)(iii)) also examines each audio frame passed by the tuner and identifies those audio frames that are addressed to that particular node frame store, and upon such identification, the audio frame storage means is activated to store that audio frame.

14. The system as claimed in claims 8, 9, or 10, wherein means (G(4)(vi) also inserts the address onto the vertical blanking interval of the audio frame and means (H(3)(iii)) also examines each audio frame passed by the tuner and identifies those audio frames that are addressed to that particular node frame store, and upon such identification, the audio frame storage means is activated to store that audio frame and wherein (a) the video disc player stores two interleaved fields as a video frame according to the standard television format and means (G(4)(vi)) encodes the address of the subscriber's node frame store module onto one of the vertical blanking intervals of the video frame;

(b) the multiplexing switch (5) passes two interleaved video fields as a video frame; and, (c) the node frame store module receives two interleaved video fields as a video frame.

15. The system as claimed in claims 8, 9, or 10, wherein means (G(4)(vi)) also inserts the address onto the vertical blanking interval of the audio frame and means (H(3)(iii)) also examines each audio frame passed by the tuner and identifies those audio frames that are addressed to that particular node frame store, and upon such identification, the audio frame storage means is activated to store that audio frame; and wherein (a) the video disc player stores two interleaved fields as a video frame according to the standard television format and means (G)(4)(vi)) encodes the address of the subscriber's node frame store onto one of the vertical blanking intervals of the video frame;

(b) the multiplexing switch (5) passes, at least every 1/25th of a second, two interleaved video fields as a video frame; and (c) the node frame store module receives two interleaved video fields as a video frame.

16. The system as claimed in claim 11, wherein step (a) encodes the address of the subscriber's node frame store module onto one of the vertical blanking intervals of each interleaved field of the video frame.

17. The system as claimed in claim 12, wherein step (a) encodes the address of the subscriber's node frame store module onto one of the vertical blanking intervals of each interleaved field of the video frame.

18. The system as claimed in claim 14, wherein step (a) encodes the address of the subscriber's node frame store module onto one of the vertical blanking intervals of each interleaved field of the video frame.

19. The system as claimed in claim 15, wherein step (a) encodes the address of the subscriber's node frame store module onto one of the vertical blanking intervals of each interleaved field of the video frame.

20. An improved method of distributing a prerecorded video frame that consists of at least one video field being a first plurality of scan lines representing a vertical blanking inteval, and a second plurality of scan linse representing video picture data, the method comprising the steps of (A) selecting
  (1) a primary path for transmission of video frames;
  (2) a node along that path; and
  (3) a secondary path from the node to a subscriber's television set;

(B) assigning a unique address to the secondary path;

(C) inserting upon a predetermined scan line of the vertical blanking interval of the frame a unique address;

(D) transmitting the video frame with the unique address along the primary path on a predetermined television channel;

(E) examining, on the primary path at the node, the predetermined scan line of the video frame for the unique address;

(F) storing that video frame at the node if the unique address matches the address of the secondary path; and (G) repetitively transmitting on said predetermined channel, at a standard television frame rate, the video frame stored at the node down the secondary path to the subscriber's television set as a still video frame.

21. The method as claimed in claim 20, including selecting, spatially along the primary path, a plurality of nodes each with a secondary path and wherein the assigning step (B) assigns a unique address to each secondary path.

22. The method as claimed in claim 21, wherein the selecting step (A) includes the additional step of selecting (4) a predetermined video frame from a plurality of pre-recorded video frames and wherein the inserting step (C) inserts the unique address of a predetermined secondary path on a predetermined scan line of the vertical blanking interval of the predetermined video frame selected by step (A)(4).

23. The method as claimed in claims 20, 21, or 22, wherein the inserting and transmitting steps (C) and (D) occur at least 25 times/second and the inserting step (C) assigns a different unique address during each step.

24. The method as claimed in claims 20, 21, or 22, including the step of (a) transmitting along the primary and one secondary path, audio associated with a uniquely addressed video frame.

25. The method as claimed in claims 20, 21, or 22, including the additional steps of
  (a) selecting a third path; and,
  (b) transmitting along the third path, audio associated with a predetermined uniquely addressed video frame.

26. The method as claimed in claims 20, 21, or 22, wherein each video frame is comprised of two interleaved video fields, each having a vertical blanking interval and step (C) inserts upon the vertical blanking interval of at least one of the video fields of the video frame a unique address.

27. The method as claimed in claims 20, 21, or 22, wherein each video frame is comprised of two interleaved video fields, each having a vertical blanking interval, and step (C) inserts upon the vertical blanking interval of each video field of the video frame a unique address.

28. The method as claimed in claim 23, wherein each video frame is comprised of two interleaved video fields, each having a vertical blanking interval and the inserting step (C) inserts upon the vertical blanking interval of at least one of the video fields of the video frame a unique address.

29. The method as claimed in claim 23, wherein each video frame is comprised of two interleaved video fields, each having a vertical blanking interval, and the inserting step (C) inserts upon the vertical blanking interval of each video field of the video field a unique address.

30. The method as claimed in claim 24, wherein each video frame is comprised of two interleaved video fields, each having a vertical blanking interval, and step (C) inserts upon the vertical blanking interval of at least one of the video fields of the video frame a unique address.

31. The method as claimed in claim 24, wherein each video frame is comprised of two interleaved video fields, each having a vertical blanking interval, and step (C) inserts upon the vertical blanking interval of each video field of the video frame a unique address.

32. the method as claimed in claim 25, wherein each video frame is comprised of two interleaved video fields, each having a vertical blanking interval, and step (C) inserts upon the vertical blanking interval of at least one of the video fields of the video frame a unique address.

33. The method as claimed in claim 25, wherein each video frame is cmprised of two interleaved video fields, each having a vertical blanking interval, and step (C) inserts upon the vertical blanking interval of each video field of the video frame a unique address.

34. The method of claim 25 wherein said third path comprises a telephone transmission line.

35. The method of claim 25 further including the steps of receiving the audio transmitted along said third path at said node, and remodulating the received audio at said node for transmission on said secondary path.

36. A node frame store for storing a video frame having at least one video field being a first plurality of scan lines representing a vertical blanking interval, and a second plurlity of scan lines representing video picture data, the node frame store comprising;
(A) means for examining signals transmitted on a predetermined television channel over a primary path for a video frame that has one of the scan lines in its video blanking interval uniquely addressed; and,
(B) means for storing a video frame and for transmitting the stored video frame repetitively at least 25 times/second onto a second path on said predetermined channel;
(C) comparator means for comparing the address examined by means (A) and on a match to a predetermined address, activating the storing means (B) to store a video frame from the primary path which has said predetermined address.

37. The node frame store as claimed in claim 36, including
(D) means for detecting audio along the primary path and transmitting it on the second path.

38. A node frame store for storing a video frame having at least one vertical field being a first plurality of scan lines representing a vertical blanking interval, and a second plurality of scan lines representing video picture data, the node frame store comprising;
(A) a television tuner to pass video frames transmitted in a predetermined range of channel frequencies on a trunk cable;
(B) a channel blocker in parallel with the television tuner to block a predetermined channel carrying the video frames on the trunk cable, while allowing other channel frequencies on the trunk to pass onto a distribution cable;
(C) a node frame store module comprising;
(1) a radio receiver connected to the trunk, and tuned to a specific radio frequency assigned to that node frame store;
(2) a video frame storage means connnected to the tuner (A) adapted for the storage and transmission of a video frame;
(3) a node frame store processing unit that examines each video frame passed by the tuner and identifies those video frames that are addressed to that particular node frame store, and upon such identification,
(4) means to modulate both the video frame from the video frame store and audio from the radio receiver onto the same television channel that was used to transmit the video frames to the node frame store, and to transmit both onto the distribution cable, along with the channels passed by the channel blocker.

39. A node frame store for storing a video frame having at least one video field being a first plurality of scan lines representing a vertical blanking interval, and a second plurality of scan lines representing video picture data, the node frame store comprising;
(A) a television tuner to pass video frames transmitted in a predetermined range of channel frequencies on a trunk cable;
(B) a channel blocker in parallel with the television tuner to block a predetermined channel carrying the video frames on the trunk cable, while allowing other channel frequencies on the trunk to pass onto the distribution cable;
(C) a node frame store module comprising;
(1) an audio frame storage means, connected to the tuner (A), to receive audio frames and to convert those frames into an analogue audio signal;
(2) a video frame storage means connected to the tuner (A) adapted for the storage and transmission of a video frame;
(3) a node frame store processing unit that examines each video frame passed by the tuner and identifies those video frames that are addressed to that particular node frame store, and upon such identification, the video frame storage means is activated to store that video frame;
(4) means to modulate both the video frame from the video frame store and the analogue audio from the audio frame storage means onto the same television channel that was used to transmit the video frames to the node frame store;
(5) means to transmit onto the distribution cable, along with the channels passed by the channel blocker, the modulated signal created by means (4).

40. A node frame store for storing a video frame having at least one video field being a first plurality of scan lines representing a vertical blanking interval, and a second plurality of scan lines representing video picture data, and for storing an audio frame having a first plurlity of scan lines representing a vertical blanking interval, and a second plurality of scan lines representing audio data, the node frame store comprising;

(A) a television tuner communicating with a primary path and adapted to pass a preselected channel that is carrying said frames;

(B) a channel blocker in parallel with the television tuner to block the channel carrying said frames on the primary path, while allowing other channel frequencies on the primary path to pass onto a second path;

(C) a node frame store module comprising;

(i) an audio frame storage means, connected to the television tuner (A), to receive audio frames and to convert those audio frames into an analogue audio signal;

(ii) a video frame storage means connected to the television tuner (A) adapted for the storage and transmisson of a video frame;

(iii) a node frame store processing unit that examines at least each video frame passed by the television tuner and identifies those audio and video frames that are addressed to a predetermined address, and upon such identification, activates the audio and video frame storage means to store respective identified frames;

(iv) means to modulate both the video frame from the video frame store means and the analogue audio from the audio frame store onto a predetermined television channel; and (v) means to transmit onto the second path the channels passed by the channel blocker and the channel created by means (C(iv)).

41. In a cable televison system of the type in which video information is transmitted on a primary communication link for dissemination to subscribers by means of a plurality of secondary paths, apparatus for providing individual video messages to the subscribers over a common transmission channel of said system, comprising:

means for storing a plurality of individual video messages;

means responsive to a subscriber-initiated request for selecting one of said video messages, encoding the selected message with an address associated with the subscriber, and transmitting the encoded message on said primary link over said common channel;

a plurality of means respectively located at the junctions of said primary link and said secondary paths for receiving video information transmitted over at least said common channel and, responsive to an address which is different for each of said receiving means, for storing the selected message; and means for transmitting the stored message over one of said secondary paths on said common channel to a television receiver of the subscriber who initiated the request.

42. The apparatus of claim 41 wherein said video messages each comprise a single video frame, and said means for transmitting the stored message repetitively transmits the single frame at a frequency related to the frame rate of a television picture to present a still frame image to the subscriber.

43. The apparatus of claim 42 wherein said means for storing a plurality of individual video messages comprises a plurality of video storage devices each storing at least a portion of said plurality of messages, and said selecting and transmitting means includes a multiplexing switch for assembling different single frame messages from various ones of said storage devices into a video signal in which the different messages are transmitted at a rate equal to the frame rate of a standard television signal.

44. The apparatus of claim 43 wherein said receiving means is capable of receiving television signals transmitted over a number of different channels and passing them onto the secondary paths, and includes a channel blocker for preventing signals transmitted on said primary link over said common channel from being passed onto said secondary path and a modulator for transmitting a stored message over said common channel on the secondary path.

45. The system of claim 41 wherein said primary link includes a trunk cable and said secondary path includes at least one of a distribution cable and a drop cable.

46. The apparatus of claim 41 further including means for storing a pluraliy of audio messages respectively associated with said video messages, and means for transmitting the audio message that is associated with a selected video message to said receiving means together with the transmitted video messages.

47. The apparatus of claim 46 wherein said receiving means includes a receiver that is tuned to a predetermined carrier frequency, and said audio message transmitting means includes a tunable transmitter for modulating a carrier signal at said predetermined frequency with a selected audio messages.

48. The apparatus of claim 46 wherein said audio message is transmitted as an audio frame in the format of a video frame, said audio message transmitting means includes means for encoding the audio frame with said address, said receiving means includes means for storing an audio frame that is encoded with said address, and said stored message transmitting means transmits a stored audio message along with the stored video message.

49. In a cable television system of the type in which video information is transmitted on a primary communication link for dissemination to subscribers via secondary paths, apparatus for providing individual single frame video messages to the subscribers over a common transmission channel of said system, comprising:

a plurality of video storage devices for storing various single frame video messages;

means responsive to a subscriber-initiated request for selecting individual frames stored in the storage devices and encoding each selected frame with an address associated with a subscriber;

means for assembling the frames selected from different storage devices into a video signal and transmitting the video signal on said primary link over said common channel at a standard television frame rate so that individual messages are transmitted at a rate that is equal to the standard frame rate;

means for receiving the video signal transmitted over at least said common channel and, responsive to said address, for storing a selected frame; and means for repetitively transmitting the stored frame at the standard frame rate on said common channel over a secondary path to a television receiver of the subscriber who initiated the request.

50. The apparatus of claim 49 wherein said receiving means is capable of receiving televison signals transmitted over a number of different channels and passing them onto the secondary paths, and includes a channel blocker for preventing signals transmitted on said primary link over said common channel from being passed onto said secondary path and a modulator for transmitting a stored message over said common channel on the secondary path.

51. The node frame store of claim 36 further including means for receiving audio signals transmitted on a third path and for transmitting received audio signals on said second path.

* * * * *